United States Patent
Fogg et al.

(10) Patent No.: US 7,400,298 B2
(45) Date of Patent: Jul. 15, 2008

(54) RADIO FREQUENCY IDENTIFICATION TAGGING

(75) Inventors: Martin Fogg, Bicester (GB); Christopher Gordon Gervase Turner, Oakley (GB)

(73) Assignee: ZIH Corp., Hamilton (BM)

( * ) Notice: Subject to any disclaimer, the term of this patent is extended or adjusted under 35 U.S.C. 154(b) by 39 days.

(21) Appl. No.: 10/527,736

(22) PCT Filed: Sep. 12, 2003

(86) PCT No.: PCT/GB03/03939

§ 371 (c)(1), (2), (4) Date: Mar. 14, 2005

(87) PCT Pub. No.: WO2004/025554

PCT Pub. Date: Mar. 25, 2004

(65) Prior Publication Data

US 2006/0163368 A1    Jul. 27, 2006

(30) Foreign Application Priority Data

Sep. 12, 2002  (GB)  .................................. 0221111.8

(51) Int. Cl.
*H01Q 1/38* (2006.01)
*G08B 13/14* (2006.01)

(52) U.S. Cl. ............................... 343/700 MS; 343/742; 340/572.7

(58) Field of Classification Search .......... 343/700 MS, 343/742, 767, 770; 340/572.7; 455/1
See application file for complete search history.

(56) References Cited

U.S. PATENT DOCUMENTS 5,497,140 A * 3/1996 Tuttle ..................... 340/10.1

(Continued)

FOREIGN PATENT DOCUMENTS

DE        19646717        5/1998

(Continued)

*Primary Examiner*—Tan Ho
(74) *Attorney, Agent, or Firm*—Alston & Bird LLP

(57) ABSTRACT

A RFID tag or label comprises a RFID tag module (comprising an electronic identification circuit and a coupling means) and an antenna structure coupled to the coupling means. The RFID tag module is separate from, separable or arranged to be severable from, the antenna structure. The tag module can be placed in or on an object and the antenna structure in or on packaging material for use with the object. A patch antenna type RFID tag antenna structure has a ground plane spaced from the patch antenna so as to increase the range of the tag. The ground plane is not substantially larger than, and electrically insulated from, the patch antenna. The ground plane is flexible, so the RFID tag structure can be worn by a human, and can be incorporated into a piece of clothing. A RFID antenna structure for use with a tag reader is made flat and robust so that it can be mounted on the ground to be walked upon or driven over. A bi-directional YAGI type RFID tag antenna structure has director elements on two opposite sides so that the YAGI antenna radiates in two opposite directions. An object includes a gain increasing metallic structure for increasing the gain of a RFI tag when placed near the object so as to form a RFID tag antenna structure.

24 Claims, 13 Drawing Sheets

U.S. PATENT DOCUMENTS

| | | | |
|---|---|---|---|
| 5,832,090 A * | 11/1998 | Raspotnik | 705/66 |
| 5,995,048 A | 11/1999 | Smithgall et al. | |
| 6,018,299 A * | 1/2000 | Eberhardt | 340/572.7 |
| 6,049,278 A | 4/2000 | Guthrie et al. | |
| 6,215,402 B1 | 4/2001 | Rao Kodukula et al. | |
| 6,278,413 B1 | 8/2001 | Hugh et al. | |
| 6,362,786 B1 | 3/2002 | Asano et al. | |
| 6,466,131 B1 * | 10/2002 | Tuttle et al. | 340/572.7 |
| 2002/0116274 A1 | 8/2002 | Hind et al. | |

FOREIGN PATENT DOCUMENTS

| | | |
|---|---|---|
| DE | 19826428 | 12/1999 |
| DE | 19910768 | 9/2000 |
| EP | 1031939 | 8/2000 |
| EP | 1130677 | 9/2001 |

* cited by examiner

RADIO FREQUENCY IDENTIFICATION TAGGING

The present invention relates to various aspects of radio frequency identification (RFID) tagging. The invention is particularly applicable to passive RFID tags, but can also be applied to powered RFID tags. In some aspects the invention relates to antenna structures for use in RFID tagging.

Passive RFID tags which operate in the UHF band (860 to 920 MHz) are known in the art. Known RFID tags comprise a RFID integrated circuit or a RFID tag module which is attached to an antenna, which can be a dipole, folded dipole, loop or patch antenna. In many situations it is desirable to use passive RFID tags for tagging objects or items such as products being sold in a supermarket, or animals or humans. The passive RFID tag can then be used, together with a tag reader, to detect the passage or presence of the tagged object, animal or human in a doorway, portal or similar. However, with currently permitted radio power levels under radio regulations in many jurisdictions the operating or reading range of standard tags is 70 cm or less, which limits the size of any doorway or portal. Furthermore, the physical orientation of the tag can limit the ability of a RFID reader to successfully read the tag.

In some aspects the present invention aims to provide a tagging technique which enables communication with a RFID tag over a reasonable distance whilst respecting other concerns such as privacy concerns and comfort. Other aims will be apparent from the description of preferred embodiments.

In one aspect the present invention provides a Radio Frequency Identification (RFID) tag or label comprising:
  a RFID tag module comprising an electronic identification circuit and a coupling means; and
  an antenna structure coupled to the coupling means,
  wherein the RFID tag module is separate from, separable or arranged to be severable from, the antenna structure.

Typically, the coupling means would be a small antenna connected to, or integral with, the electronic identification circuit, whereas the antenna structure can be a larger metallic structure. The antenna structure can, for example, comprise a conductive wire which is arranged parallel and in proximity to the coupling means of the tag module.

Taking the tagging of a shirt in a shop as an example, according to the above technique, the shirt can be tagged with a very small tag module (having a short operating range, e.g. a few centimetres). An antenna structure such as a metallic foil can be provided on or in the packaging of the shirt, i.e. separate from the shirt. The antenna structure effectively increases the operating range of the tag module, i.e. it enables the tag to be read over a larger distance (e.g. a few metres). This makes the tag suitable for stock control or theft prevention. When the packaging is removed by the customer the antenna structure is separated from the shirt, but the small tag module remains in the shirt. The tag module can then no longer be read over the larger distance of e.g. a few metres, but it can still be read over the shorter distance of e.g. a few cms.

Since the tag module is very small its presence in the shirt (which may e.g. be integrated into the collar) does not affect the wearing comfort. On the other hand the fact that the tag module remains in the shirt means that the tag module can still be read once the packaging has been removed (e.g. for guarantee purposes), albeit over the smaller range. Stock control and theft prevention are then no longer necessary.

This technique also addresses the concerns of privacy campaigners. Since after separation of the antenna structure from the tag module the operating range of the tag module is very limited it is impossible to misuse the tagged shirt by tracking the movement of an individual wearing the tagged shirt.

In many situations the antenna structure would be separate or separable from the remainder of the tag, i.e. the tag module. However, it can also initially be connected to, or integral with, the tag module, in which case a specific provision will have been made to permit the antenna structure to be severed from the tag module during normal use.

This could take the form of a preferred line of fracture in the material (which may or may not be conductive) linking the antenna structure and the remainder of the tag.

The antenna structure may also comprise a metal rod or wire. In some embodiments the rod or wire is straight, but it can alternatively be multidimensional, i.e. not straight. This may improve the ability of the tag module to be communicated with from different directions. The antenna structure may also comprise a plurality of antenna elements, e.g. several rods or wires. Again, the ability of the tag module to be communicated with from different directions can be improved by providing several rods or wires which are substantially non-parallel. Each wire or rod is then "responsible" for covering a particular space angle.

Depending on the specific requirements, the RFID tag module can be constructed such that it can substantially not be communicated with when it is not coupled to the antenna structure. It could, for example, consist of the electronic identification circuit and a galvanic connection to the antenna structure (which is not part of the tag module). Once the connection between the circuit and the antenna structure is severed (e.g. by breaking the galvanic connection) the tag can not be communicated with using RF technology, although it may be possible to reconnect (i.e. galvanically connect) the tag module to another (or the original) antenna structure to restore the ability to communicate with the tag.

Alternatively, the RFID tag module may be constructed such that it can be communicated with (by RF technology) when it is not coupled to the antenna structure, i.e. it can, for example, have its own antenna (which may be integrated into the circuit). However, in the preferred embodiment the (external) antenna structure enhances the ability to communicate with the tag module. For example, the distance over which the module can be communicated with when it is not coupled to the (external) antenna structure could be d0, the distance over which it can be communicated with when it is coupled to the (external) antenna structure could be d1, wherein d1 is substantially larger than d0.

The "communication" with the RFID tag module can take various forms such as:
  reading the identity of the tag
  writing the identity of the tag
  accessing the data in the tag by reading or writing
  modifying the state of the tag's state machine or registers or arbitrating a plurality of tags.

The tag module on its own may have a first operating frequency. When the antenna structure is coupled to the coupling means the RFID tag or label may have a second operating frequency, which may be different from the first operating frequency, i.e. the antenna structure influences/determines the operating frequency of the tag or label.

In another aspect the present invention extends to an object for use with a first Radio Frequency Identification (RFID) tag module, the object comprising an antenna structure which is integral with, or attached to, the object and which is arranged
  to improve the ability to communicate with the first REID tag module, and/or
  to increase the range over which the first RFID tag module can be communicated with, and/or to improve the ability to communicate with the first RFID tag module in multiple directions, when the first RFID tag module is used in combination with the object so as to form a first RFID tag or label.

The object can be packaging material, e.g. a piece of cardboard for supporting a folded shirt, to which cardboard an antenna structure (e.g. metal foil of particular dimensions) has been attached, or which is integral with such an antenna structure.

Alternatively, the object may comprise a transport means such as a container or a pallet. The antenna structure of the transport means enables or improves communication with items which have been provided with a RFID tag module and which are to be transported by the transport means.

Preferably, the object comprises a second RFID tag module which is coupled to the antenna structure, so as to form a second RFID tag or label. In other words, the object has its own "stand alone" tag, whilst also performing its function of enabling or improving communication with the tag module of any items to be transported by the object.

Such an arrangement is of particular use in connection with re-usable or returnable containers, pallets or clothes rails etc, whose movements can be tracked, as well as the movements of the items in the containers or on the pallets or clothes rails.

Preferably, the antenna structure of the object can be used as antenna structure for several tag modules.

In another aspect the present invention provides a method of manufacturing a RFID tag or label, comprising:

providing a RFID tag module comprising an electronic identification circuit and a coupling means; and coupling an antenna structure to the coupling means, wherein the RFID tag module is separate from, separable or arranged to be severable from, the antenna structure.

In another aspect the present invention provides a method of operating a Radio Frequency Identification (RFID) system, comprising:

providing a RFID tag in which a RFID tag module is coupled to an antenna structure; and separating or severing the RFID tag module from the antenna structure.

In another aspect the present invention provides a Radio Frequency Identification (RFID) system comprising:

at least one Radio Frequency Identification (RFID) tag or label comprising:

a RFID tag module comprising an electronic identification circuit and a coupling means; and an antenna structure coupled to the coupling means, and at least one RFID communication means, wherein the RFID tag module is separate from, separable or arranged to be severable from, the antenna structure.

The RFID communication means may, for example, comprise a RFID reader or any other device which is suitable for performing the various forms of communication with the tag module via the antenna structure which are identified above.

Preferably, the RFID tag module can be communicated with by means of a first said RFID communication means when the antenna structure is coupled to the coupling means, and can be communicated with by means of a second said RFID communication means when the antenna structure is not coupled to the coupling means, but cannot be communicated with by means of the first said RFID communication means when the antenna structure is not coupled to the coupling means. Using again the above example of the shirt, the first RFID communication means may, for example, comprise a RFID reader for guarantee claims (i.e. operational only over a short range), whereas the second reader may, for example, comprise a RFID reader (operational over a larger range) placed at a doorway or portal for stock control or theft prevention.

In another aspect the present invention provides an antenna structure for use in a REID tag or label comprising a RFID tag module and a said antenna structure, the antenna structure comprising:

a metallic material of such characteristics that, when brought into a coupling relationship with the RFID tag module, it improves the ability to communicate with the RFID tag or label and/or it increases the operating range of the RFID tag or label and/or it improves the ability to communicate with the REID tag or label in multiple directions, wherein the antenna structure is not galvanically connected to the RFID tag module.

Preferably, the antenna structure is connected to, or integral with, packaging material.

In another aspect the present invention provides an object comprising a Radio Frequency Identification (RFID) tag module which is integral with, or attached to, the remainder of the object and which is for coupling to a suitable antenna structure so as to form a RFID tag or label, wherein, when the RFID tag module is coupled to a suitable antenna structure, the ability to communicate with the RFID tag module is improved, and/or the range over which the RFID tag module can be communicated with is increased, and/or the ability to communicate with the RFID tag module in multiple directions is improved, when compared with a situation in which the R-ID tag module is not coupled to a suitable antenna structure.

Preferably, the RFID tag module is in such a way integral with, or attached to, the remainder of the object that it cannot be connected to a said antenna structure by a galvanic connection. Using again the above example of the shirt, the RFID tag module can be incorporated into the collar of the shirt (the object) so that the module is completely surrounded by the material of the shirt. As the tag module is not accessible from the outside it is impossible (during normal use of the shirt) to establish a galvanic connection with the tag module.

In some aspects the present invention aims to increase the range of passive RFID tags. U.S. Pat. No. 6,278,413 discloses a RFID tag with driven antenna element which is provided with a reflector element 38 on one side of the driven antenna element 18 and a director element 36 on the other side of the driven antenna element (see for example FIG. 27). The driven antenna element, the reflector element and the director element are mounted on a substrate, which substrate can be folded or formed into a roll. It will be appreciated that, in particular in the folded state, this structure is prone to damage or detuning.

U.S. Pat. No. 6,215,402 discloses a RFID tag including a patch antenna and a ground plane spaced from the patch antenna.

The present inventors have appreciated that the RFID tag disclosed in U.S. Pat. No. 6,215,402 is relatively large, due to the fact that the ground plane is substantially larger than the patch antenna of the tag structure. The present inventors have found that, surprisingly, the ground plane does not need to be substantially larger than the patch antenna without significant loss of range.

Hence, in another aspect the present invention provides a Radio Frequency Identification (RFID) tag antenna structure comprising: a patch antenna; and a ground plane spaced from the antenna, wherein the area spanned by the ground plane is not substantially larger than the area spanned by the patch antenna.

Due to its reduced size the RFID tag structure can be more easily used to tag objects, and when used to tag humans or animals it can be worn with more comfort.

Pursuant to a related aspect the inventors have researched how the wearing comfort of a RFID tag structure can be increased. He has found that the ground plane can be made from a flexible material, such as a metallic mesh or a foil.

In another aspect the present invention provides a Radio Frequency Identification (RFID) tag antenna structure comprising: a patch antenna; and a ground plane spaced from the antenna, wherein the ground plane is flexible.

In particular if the ground plane is made from a mesh it can conveniently be incorporated into a piece of clothing, thereby increasing the wearing comfort. This aspect is also provided independently.

In another aspect the present invention provides a Radio Frequency Identification (RFID) tagging method comprising incorporating a patch antenna and a ground plane spaced from the antenna into a piece of clothing. This is of course not to be confused with the tagging of clothes in a shop, where the tag is provided externally of the piece of clothing and connected thereto by a flexible piece of plastic material or similar.

In another aspect the present invention provides an object for use with a Radio Frequency Identification (RFID) tag, the object comprising a metallic structure which is integral with the rest of the object and which is arranged to increase the efficiency of a said RFID tag when used in combination with the object so as to form a Radio Frequency Identification (RFID) tag antenna structure. The metallic structure may, for example, comprise a ground plane for a patch antenna or one or more strips of metal foil or metal rods.

According to this aspect a standard REID tag (i.e. without gain increasing metal structures such as a ground plane or director and/or reflector elements) can be mounted to the object to be tagged. This means that the standard RFID tag only needs to be handled once, which is less when compared with a technique according to which a ground plane or reflector/director element is first mounted to the RFID tag and then the REID tag and the ground plane or director/reflector element are mounted to the object. Further, in particular if the metallic structure is moulded into the material of the object, there are fewer parts which stand proud of the surface of the object.

In another aspect the present invention provides a Radio Frequency Identification (RFID) antenna structure comprising: a patch antenna; and a ground plane spaced from the antenna, wherein the patch antenna is supported and strong enough so as to withstand substantial forces in a direction perpendicular to its surface.

This is of particular use if a RFID antenna structure is required which can be placed on the ground or a floor, for example in order to detect, when connected to a tag reader, the passage of an object, a human or an animal across the ground or floor.

By altering the size of the ground plane or second plane the radiation pattern can be varied.

According to U.S. Pat. No. 6,215,402 the patch antenna of the RFID tag and the ground plane are electrically connected via a circuit including a quarterwave transformer. The present inventors have found that, in fact, no electrical connection between the ground plane and the antenna is necessary.

In another aspect the present invention provides a Radio Frequency Identification (RFID) tag antenna structure comprising: a patch antenna; and a ground plane spaced from the antenna, wherein the ground plane is electrically insulated from the patch antenna.

Pursuant to a further aspect of the invention the present inventors have found that a multi-element antenna similar in construction to a YAGI type RFID tag antenna structure can be made to radiate in two opposite directions. Whilst according to U.S. Pat. No. 6,278,413 a reflector element (of the same length as the driven antenna element) is placed on one side of the driven antenna element, and a (shorter) director element is placed on the opposite side of the driven element, the inventors have found that by using two director elements on opposite sides of the driven antenna element the RFID tag can be made to radiate in opposite directions.

It is usual for YAGI antenna elements to be shortened as their distance from the active element is increased. This is not necessarily the case with the multi-element antenna structure disclosed herein. In fact, it is preferred that all antenna elements on either side of the active element have the same length.

Accordingly, in another aspect the present invention provides a multi-element Radio Frequency Identification (RFID) tag antenna structure comprising: a RFID tag; an antenna element driven by the RFID tag; and at least two director elements, at least one on each of two opposite sides of the driven antenna element, whereby the multi-element antenna is able to radiate in two opposite directions.

Apparatus aspects corresponding to method aspects disclosed herein are also provided, and vice versa.

Some preferred embodiments of the invention will now be described by way of example only and with reference to the accompanying drawings, in which.

Figure 1:
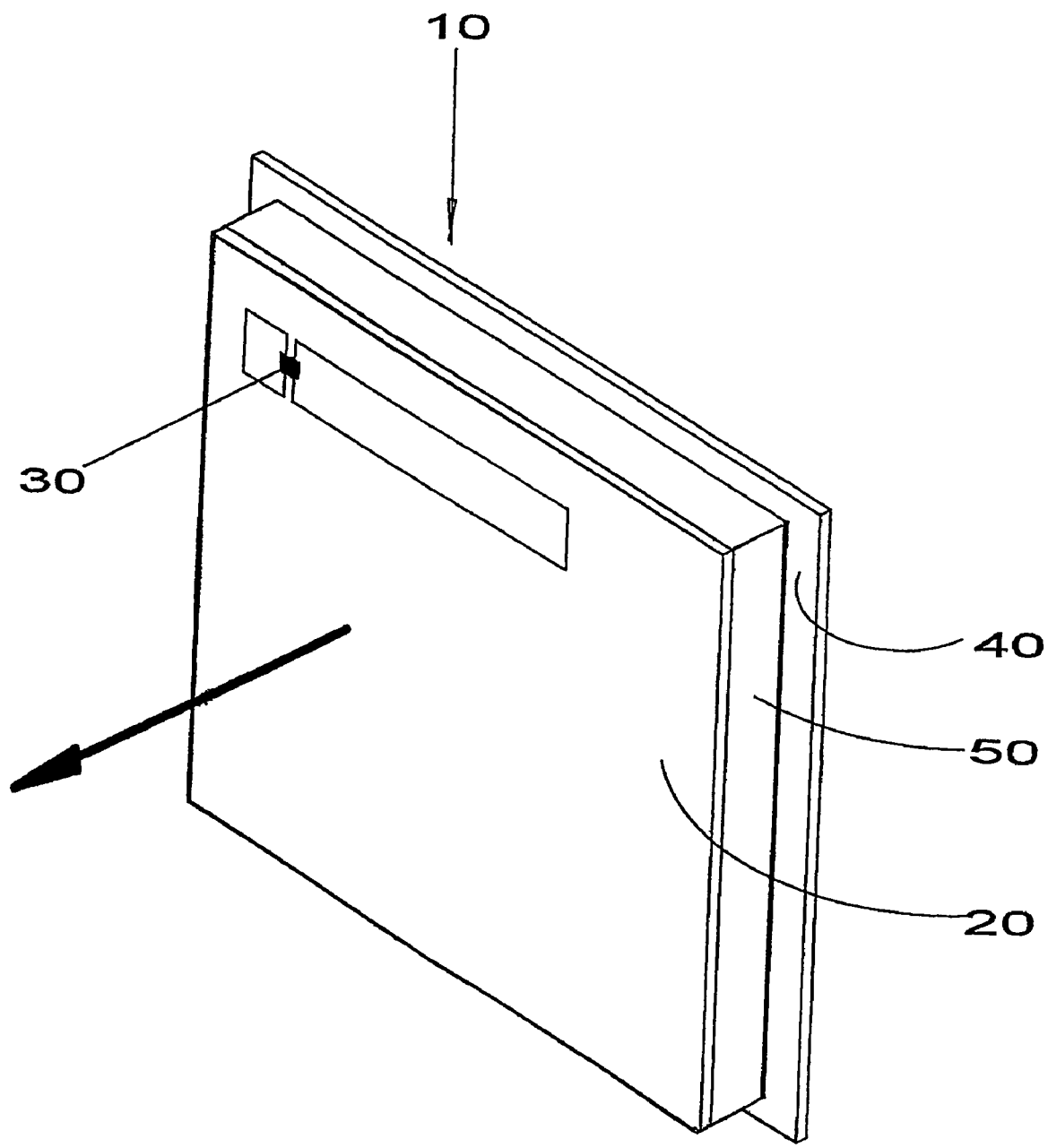
FIG. 1 shows a perspective view of a passive RFID tag antenna structure according to an embodiment of the present invention.

Referring now to FIG. 1, a first embodiment of a passive RFID tag antenna structure according to the present invention is shown. The RFID tag antenna structure 10 comprises a patch antenna 20 with a RFID tag integrated circuit 30. A ground plane 40 of metallic material is provided, which extends parallel to the patch antenna 20. The area spanned by the ground plane 40 is only slightly larger than the area spanned by the patch antenna 20. A dielectric 50 fills the space between the patch antenna 20 and the ground plane 40.

Whilst a relatively large absorbing body such as a bucket of water or a human body would absorb most of the RF power of the patch antenna without the ground plane when brought near the absorbing body, the ground plane 40 effectively shields the patch antenna 20 against absorbing bodies "behind" the ground plane 40, even if such absorbing bodies are much larger than the ground plane 40. Since the ground plane 40 is only slightly larger than the patch antenna 20 the overall dimensions of the RFID tag antenna structure are only slightly larger than those of the patch antenna 20.

According to some embodiments of the present invention the ground plane 40 can be made from a flexible material such as a mesh or a foil. This enables the RFID tag antenna structure to be worn by a human or animal with more comfort when compared with a RFID tag antenna structure with a rigid ground plane. The ground plane 40 and/or the patch antenna 20 can then be incorporated into a piece of clothing. For example, the entire RFID tag antenna structure can be sandwiched between two layers of fabric. Alternatively, a layer of fabric can be used as the dielectric 50, i.e. the layer of fabric is sandwiched between the patch antenna 20 and the ground plane 40.

In trials by the present inventors good results (in terms of range) have been obtained by using a ground plane which spans an area which is less than 2.5 times the area spanned by the patch antenna, less than 2 times, less than 1.5 times or even less than 1.2 times the area spanned by the patch antenna.

Figure 2:
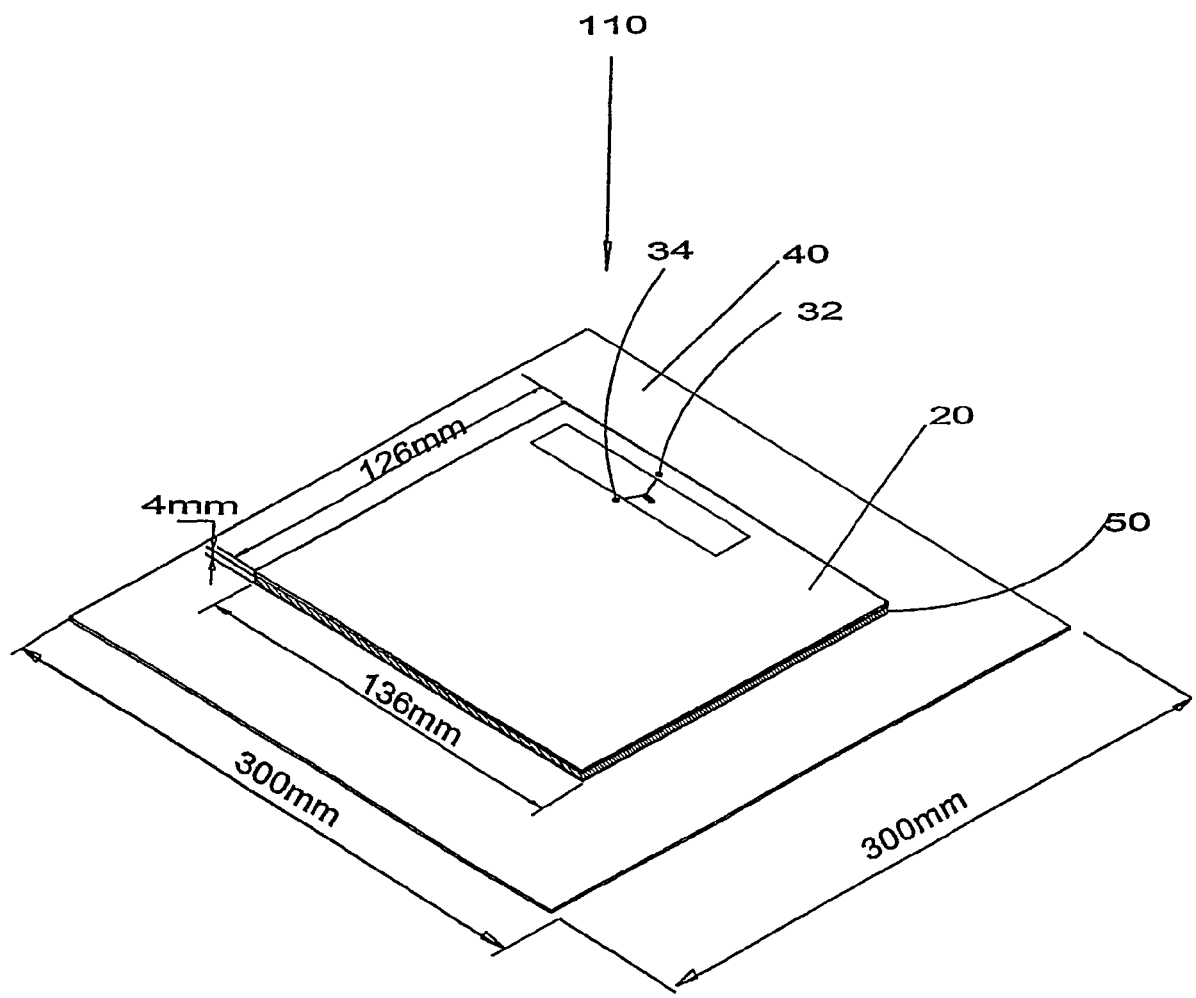
FIG. 2 shows a perspective view of a RFID tag antenna structure for connection to a tag reader in accordance with an embodiment of the present invention.

Referring now to FIG. 2, the RFID antenna structure 110 for connection to a tag reader (not shown) has a structure similar to the RFID tag antenna structure 10 of FIG. 1. The RFID antenna structure 110 comprises a patch antenna 20, a ground plane 40 and a dielectric 50 as in FIG. 1. Dimensions of one embodiment are shown in FIG. 2 by way of example. The antenna structure 110 further includes coax cable connections 32 and 34 for connection to a tag reader. In the example shown the thickness of the dielectric 50 is only 4 mm, which renders the antenna structure 110 particularly flat. It can be mounted on the ground or a floor and, due to its flat design, can easily be walked upon or driven over. The antenna structure 110 shown in FIG. 2 could thus be used to control the passage of any tagged goods through the doors of a supermarket or a warehouse.

In order to enable the antenna structure 110 of FIG. 2 to be walked upon or driven over, the three main components (patch antenna 20, ground plane 40 and dielectric 50) are made of a sufficiently strong material. The antenna structure 110 could also be covered or encased for added protection.

Figure 3:
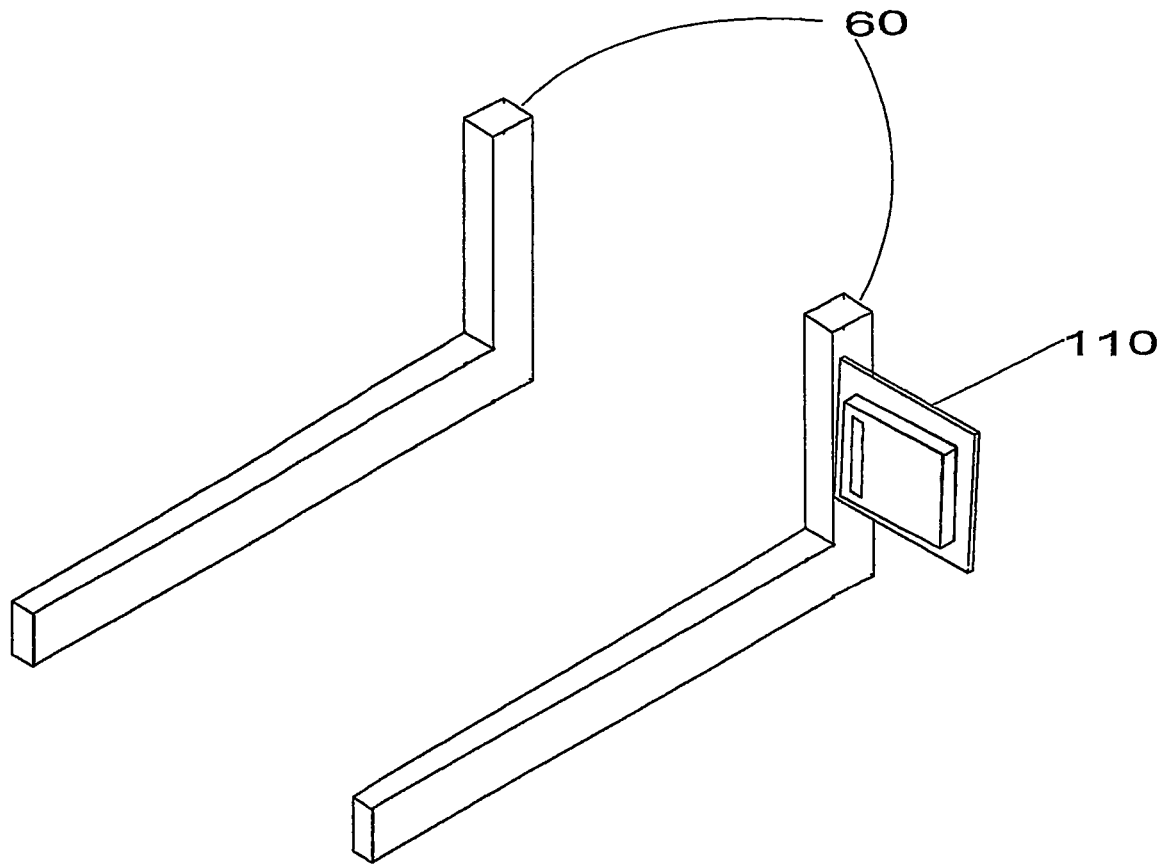
FIG. 3 shows a particular use of the antenna structure shown in FIG. 2.

FIG. 3 shows a further use of the antenna structure 110. As shown in FIG. 3, the antenna structure 110 is attached to one of the rear portions 60 of the fork of a fork-lift truck. Again, the antenna structure 110 should be made sufficiently-robust to resist any damage.

Common to all of the antenna structures 10 and 110 shown in FIGS. 1 to 3 is the fact that the patch antenna 20 is electrically insulated from the ground plane 40 by means of the dielectric 50. This renders the structure particularly simple and hence enables manufacture at low cost.

Figure 4:
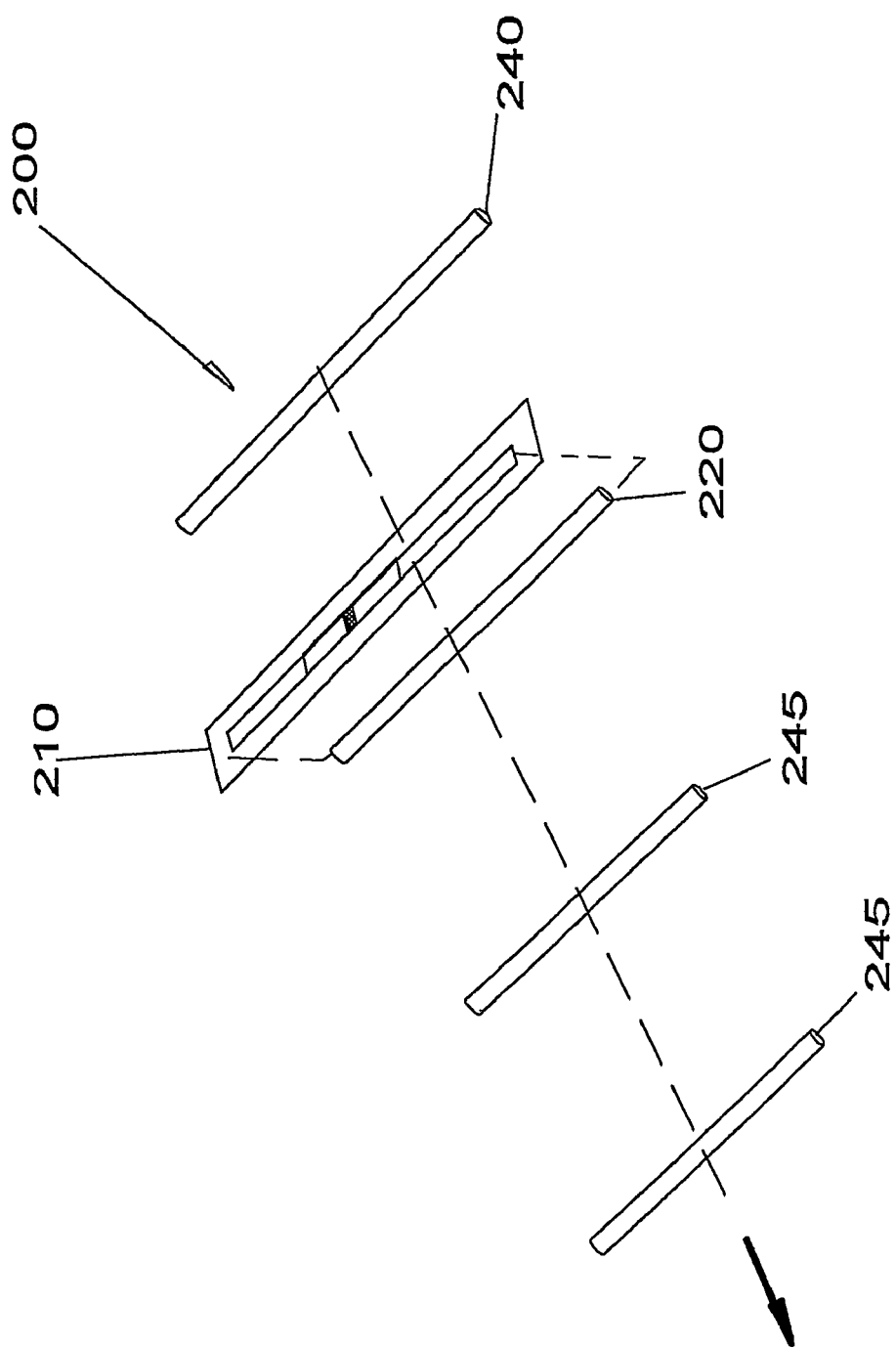
FIG. 4 shows a YAGI type antenna structure for use in an embodiment of the present invention.

FIG. 4 shows a YAGI type radio frequency identification tag antenna structure 200. This comprises a conventional RFID tag 210 placed above a driven rod 220. A reflector 240 (which is of the same length or greater than the driven rod 220) is arranged on one side of the driven rod 220, and one or more director elements 245 are arranged at the opposite side of the driven antenna element 220. The driven element 220, the director elements 245 and the reflector element 240 are all located in the same plane. For proper tuning of the antenna structure 200 the spacing between the driven element 220 and the reflector element 240 and the director elements 245 can be determined empirically. The spacing may depend on the material which fills the space between the driven/reflector/director elements.

Figure 5:
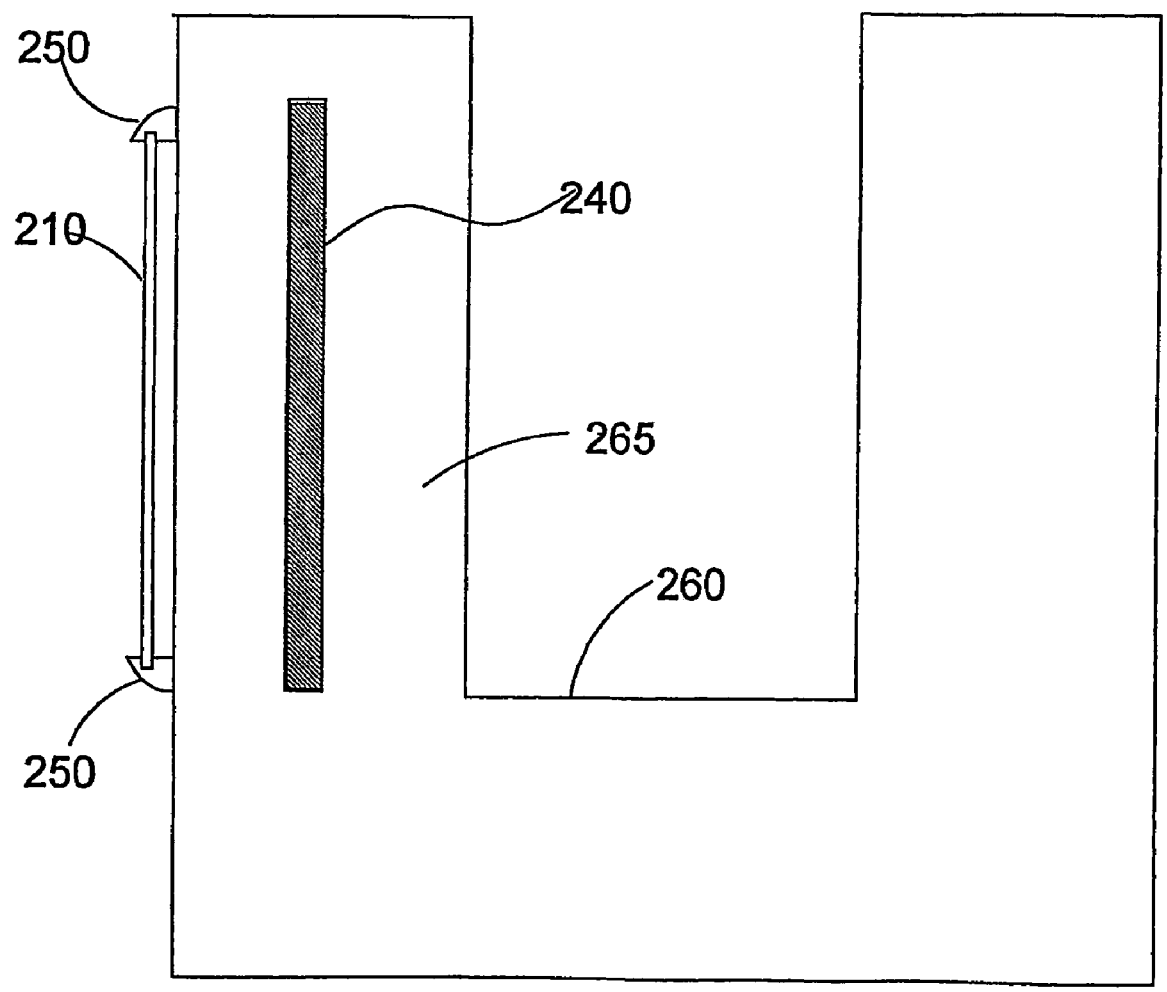
FIG. 5 shows an object with integral gain increasing metallic structure according to an embodiment of the present invention.

As indicated in FIG. 5, the structure of FIG. 4 can be incorporated into an object 260 such as a plastic bucket or crate. FIG. 5 shows a crate 260 in cross section. One or more of the driven antenna element 220, the reflector element 240 and the director elements 245 are moulded into the side-wall 265 of crate 260. In FIG. 5 only the reflector element 240 is shown. The driven antenna element 220 and director elements 245 are located "behind" the reflector element 240, i.e. behind the paper plane. The reflector element 240, the driven antenna element 220 and the director elements 245 form an integral part of the crate 260. The crate 260 is also provided withholding protrusions 250 for receiving a RFID tag 210. This, together with the driven antenna element 220, the reflector element 240 and the director elements 245 form a multi-element antenna similar in construction to a YAGI antenna.

Instead of being provided externally, the RFID tag 210 could also be incorporated into the wall 265 of crate 260.

In an alternative embodiment (not shown) the side-wall 265 of crate 260 includes a metallic ground plane 40 instead of the driven, director and reflector elements. A patch antenna 20 is either mounted on the surface of the side-wall 265 of crate 260, or moulded into the material of the side-wall 265 of crate 260. The material of the side-wall 265 between the ground plane and the patch antenna effectively forms the dielectric material 50 for the patch type antenna structure.

Figure 6:
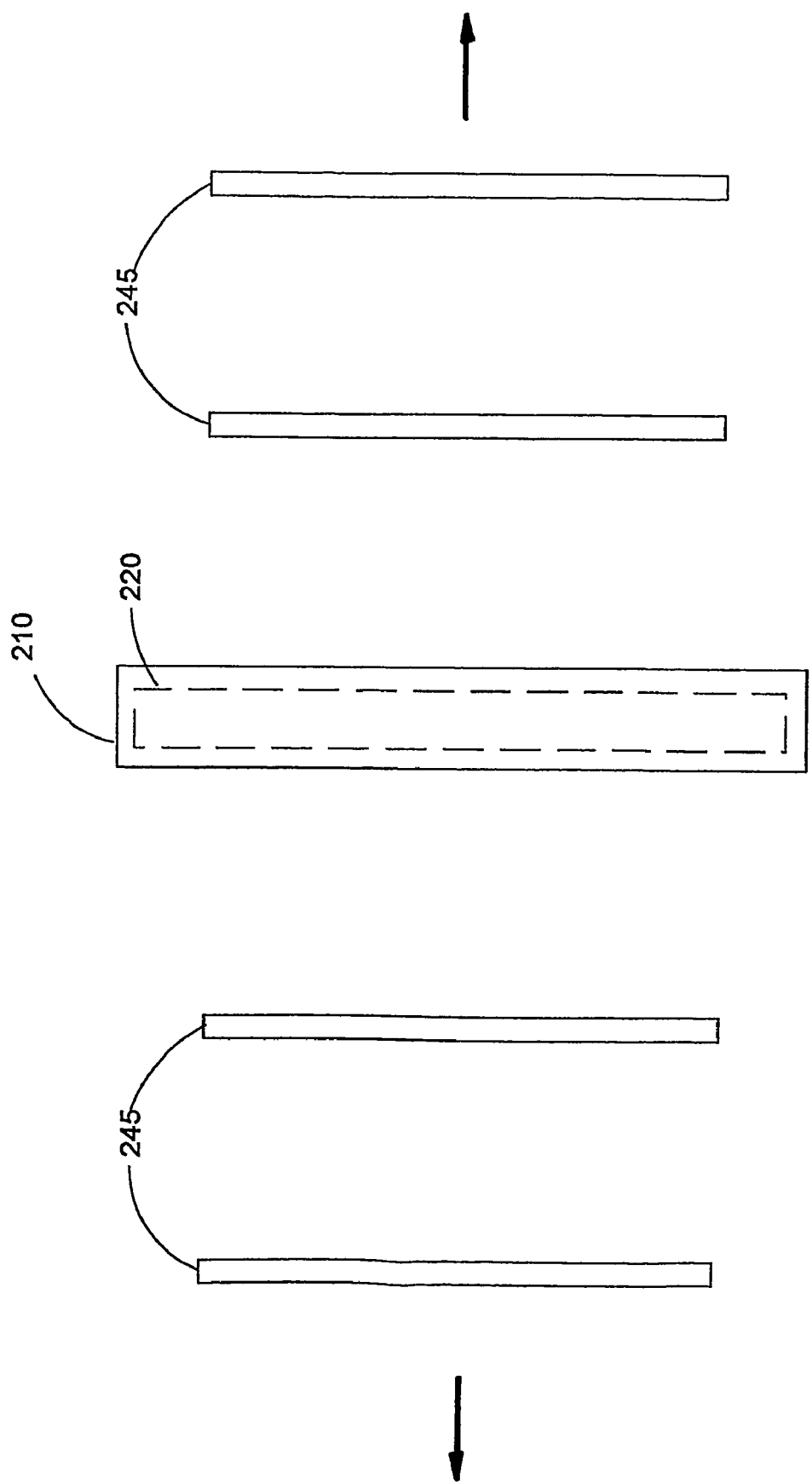
FIG. 6 shows a bi-directional YAGI antenna structure according to an embodiment of the present invention.

Referring now to FIG. 6, this shows a bi-directional multi-element antenna structure similar in construction to a YAGI antenna structure. The basic structure is similar to that of the embodiment shown in FIG. 4. However, instead of the reflector element 240 shown in FIG. 4, the FIG. 6 embodiment has two further director elements 245 opposite those director elements 245 which are shown in FIG. 4. The antenna structure shown in FIG. 6 is suitable for radiating in both directions as indicated by bold arrows.

In some embodiments a RFID tag is provided which has a RFID tag module coupled to an antenna structure which is separate from, separable from, or arranged to be severable from the tag module.

Figure 7:
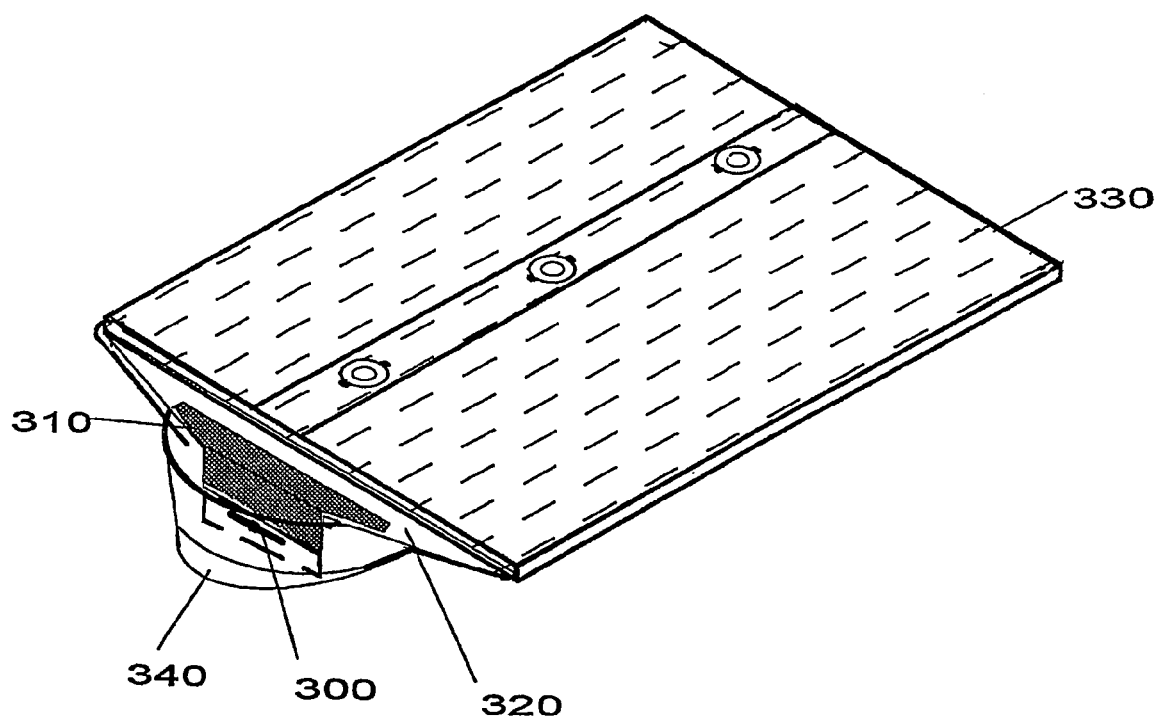
FIG. 7 shows a perspective view of a RFID tag with separate tag module and antenna structure according to an embodiment of the present invention.

FIG. 7 shows such an embodiment. This figure shows a tagged item 330, in this example a shirt. The shirt 330 is arranged on a piece of cardboard 320. A RFID tag module 300 is embedded in the collar 340 of shirt 330. In preferred embodiments the tag module is sandwiched between two layers of material of the shirt collar 340 so that it is not visible. A piece of metal foil 310 (shown here in cross-hatching and) is attached to a portion of the cardboard 320, for example by means of an adhesive, such that it is located near the tag module 300. Part of the metal foil 310 extends into the space between two folded portions of the collar, as indicated by a dashed line in FIG. 7. As long as the tag module 300 is situated near the metal foil 310 the metal foil acts as an antenna structure for the tag module 300, i.e. it is coupled to the tag module, e.g. by electromagnetic, inductive or capacitive coupling, i.e. non-contact coupling.

The metal foil 310 enables the tag to be communicated with (e.g. by a RFID reader) over a relatively large range, for example a few metres. In the preferred embodiment the tag module can be communicated with even if it is not coupled to the metal foil 310. However, the range over which it can be communicated with is much shorter than when it is coupled to the metal foil 310.

Figure 8:
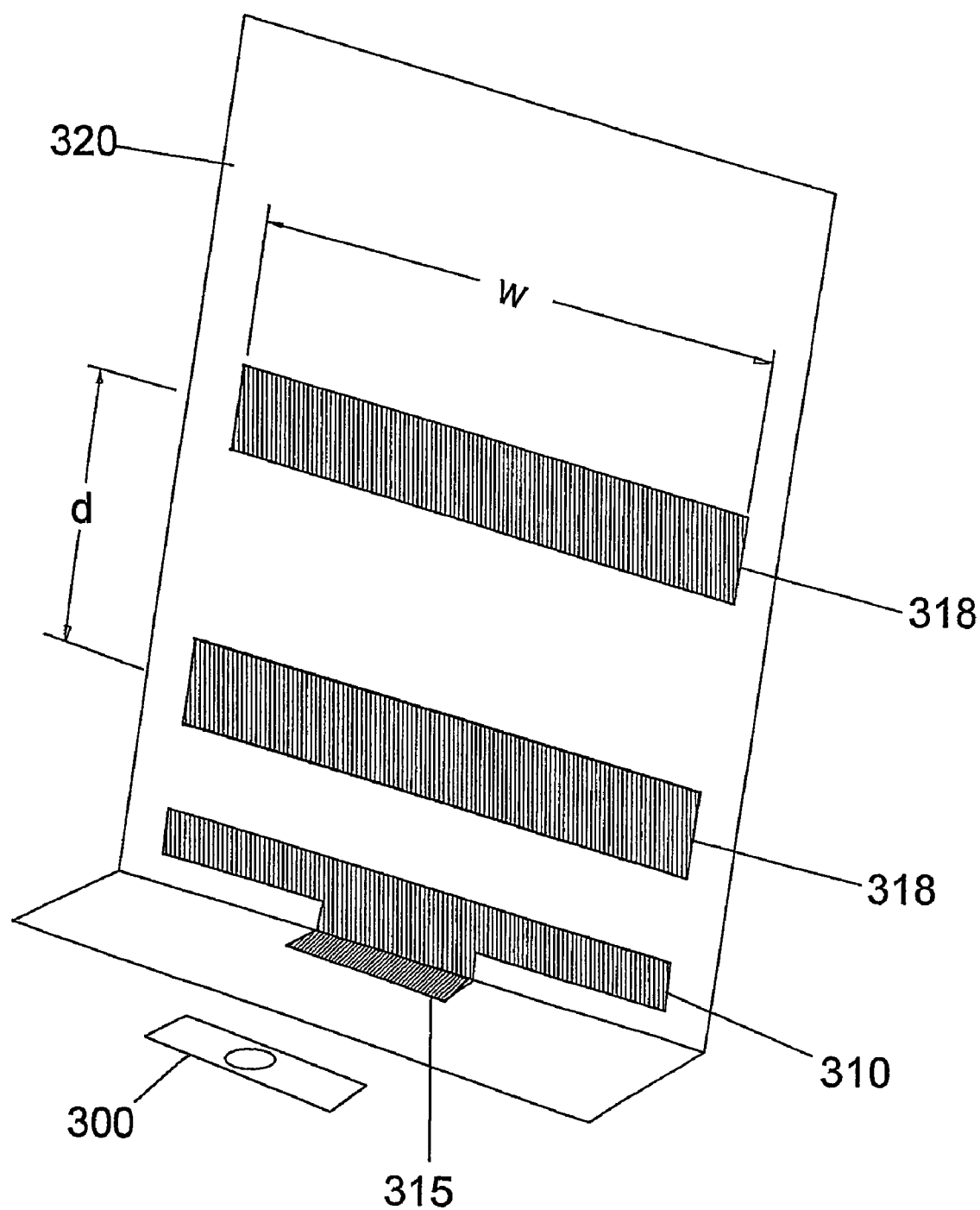
FIG. 8 shows a perspective view of a RFID tag with separate tag module and antenna structure according to an embodiment of the present invention.

FIG. 8 shows a modification of the embodiment shown in FIG. 7. Again, a RFID tag module 300 and a piece of cardboard 320 is shown. The shirt has been omitted in FIG. 8. Cardboard 320 carries 3 strips of metal foil 310 and 318 constituting a multiple-element antenna structure similar in construction to a YAGI antenna. Metal strip 310 is provided with a lip 315 to facilitate coupling between tag module 300 and the antenna structure. The width w of the strips 310 and 318 is preferably, but not necessarily, chosen to be $\lambda/2$, $\lambda$ being the wavelength corresponding to the operating frequency of the tag module. Good results are generally achieved if the width w is an odd multiple of $\lambda/2$, although this is not essential. The spacing d between the multiple elements 310 and 318 of the antenna structure is preferably chosen to be $\lambda/4$ to $\lambda/6$, but this is also not essential.

Figure 9:
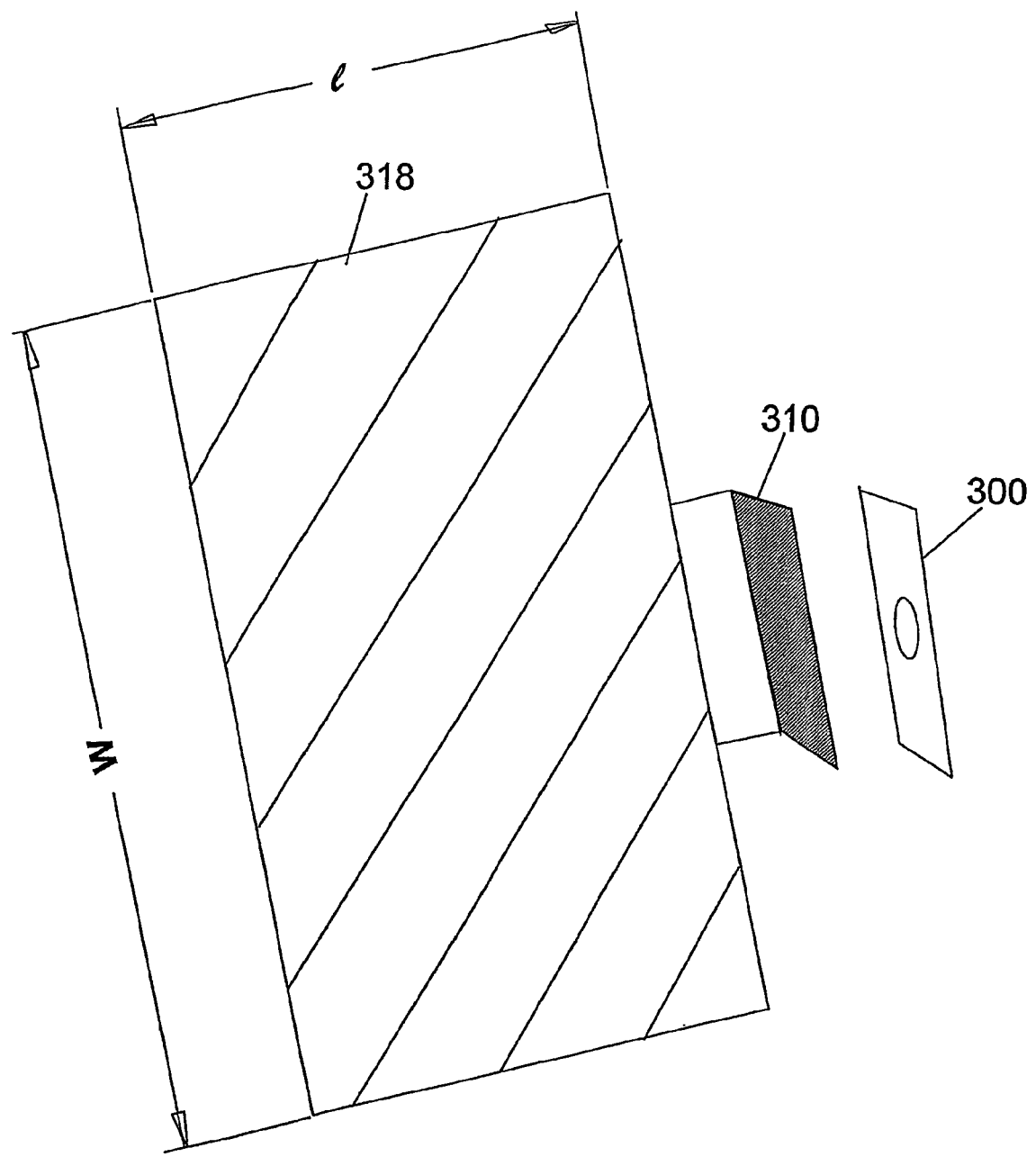
FIG. 9 shows a perspective view of a RFID tag with separate tag module and antenna structure according to an embodiment of the present invention.

However, it is preferred that a dimension of the antenna structure or its elements is $\lambda/2$. FIG. 9 illustrates this. Shown is again a tag module 300 in coupling relationship with strips of metal foil 310 and 318 as in FIG. 8. The length and width of the larger piece of metal foil 318 is shown as l and w. One of these is preferably chosen as $\lambda/2$.

Figure 10:
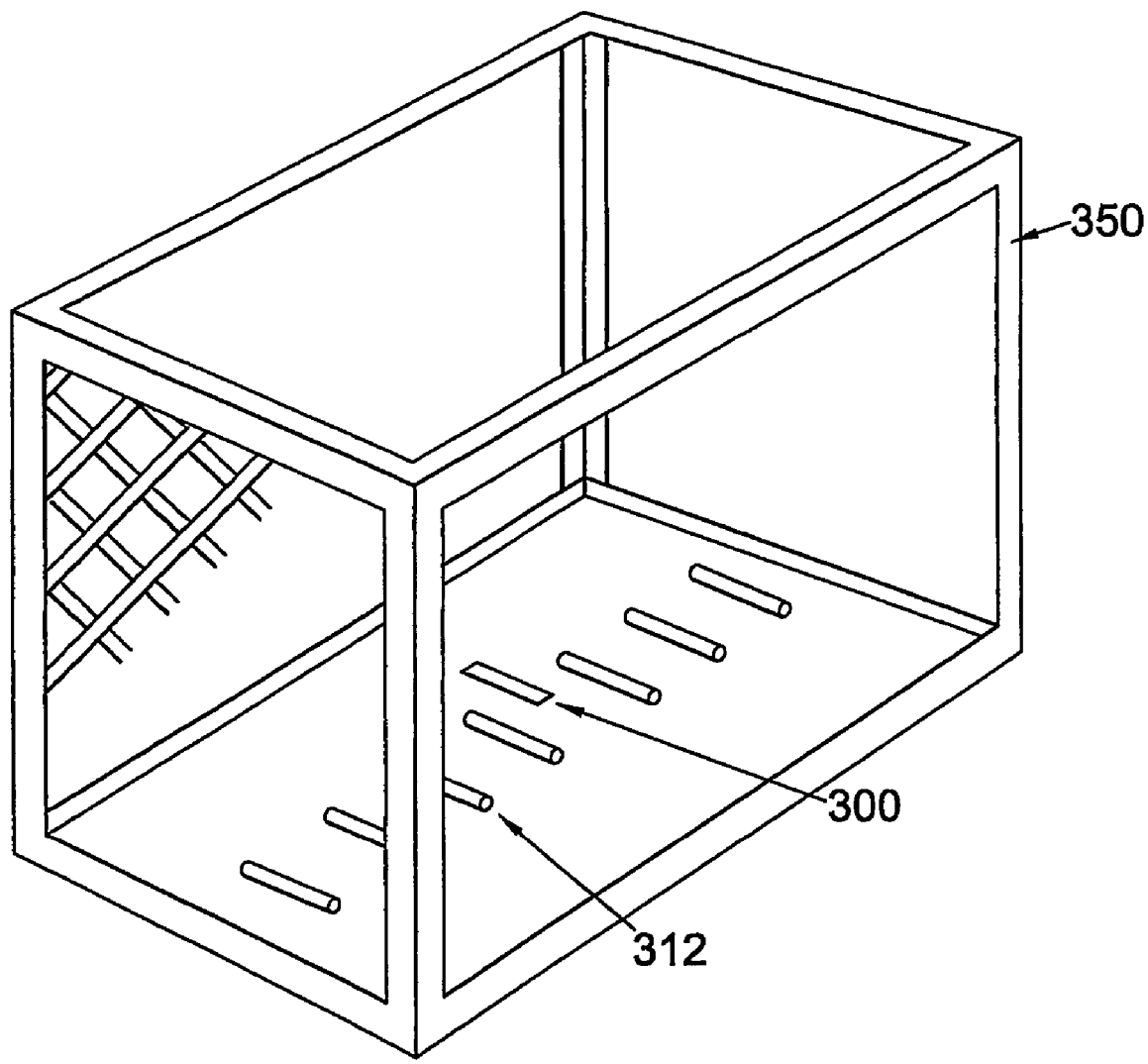
FIG. 10 shows a perspective view of a crate incorporating an antenna structure according to an embodiment of the present invention.

FIG. 10 shows an alternative embodiment. FIG. 10 shows a crate 350. Several antenna elements 312 (in this example metal rods) are embedded into the base of the crate, which are all equidistant and of the same length. When an item (not shown) carrying tag module 300 is placed in the crate 350 the tag module 300 is in coupling relationship with the antenna elements and thus forms a RFID tag. This tag can be communicated with over a larger distance than if the antenna structure formed by rods 312 was not present.

As a modification, the crate could have its own tag module (not shown), preferably embedded, and either directly connected to one of the rods 312 by means of a galvanic connection, or coupled thereto by means of a non-contact coupling. This modification enables communication with the crate's own tag module and with the modules of any items placed within the crate 350.

Figure 11:
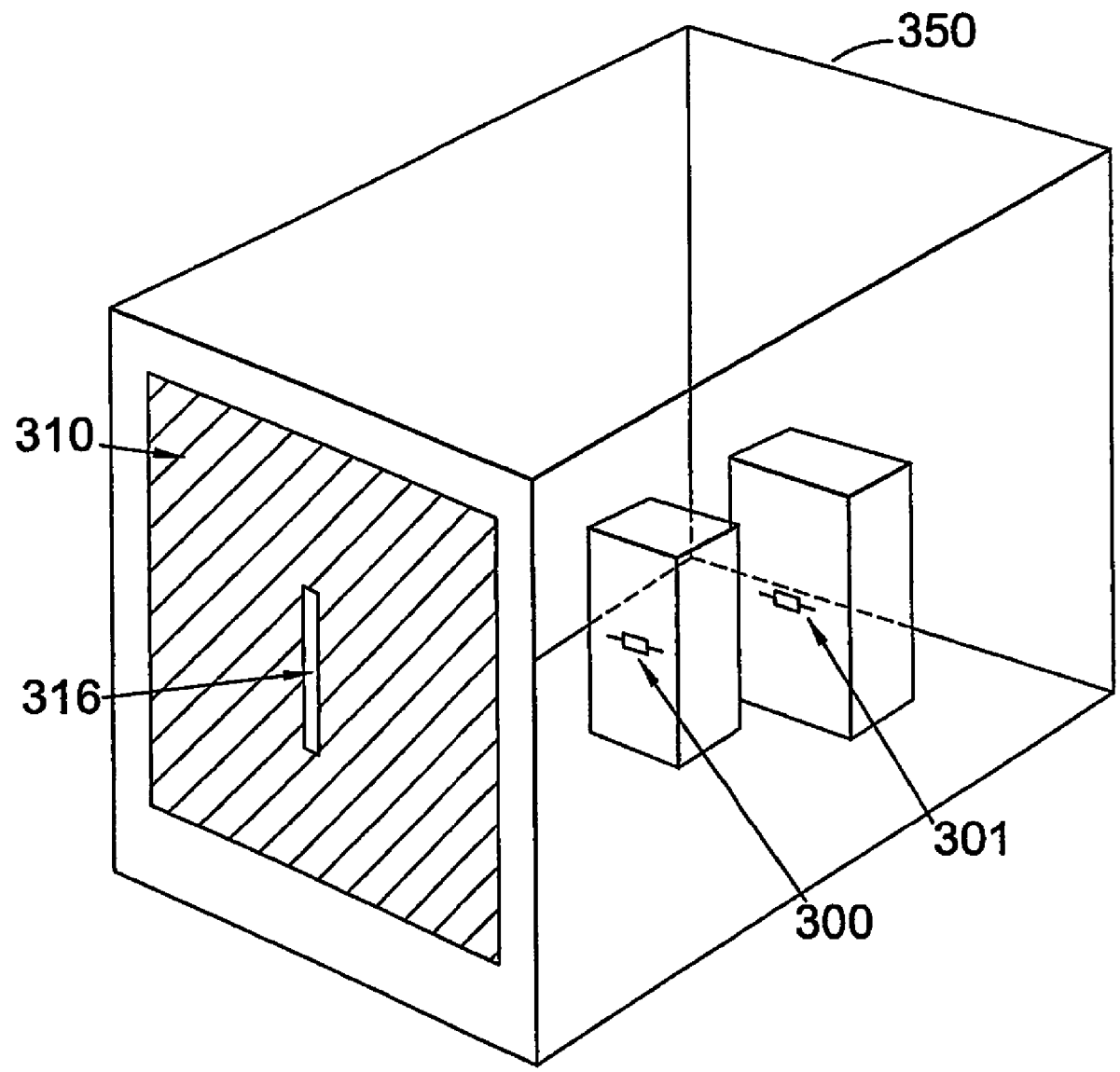
FIG. 11 shows a perspective view of a container incorporating a slot antenna structure and items placed within the container according to an embodiment of the present invention.

FIG. 11 shows an alternative embodiment using a slot antenna 310 mounted to a side of a crate or container. The slot antenna 310 consists of a metal foil with a slot 316 extending vertically in FIG. 1, i.e. with polarization extending horizontally. Two tagged items are placed within crate or container 350, with their tag modules 300 and 301 being arranged such that their polarizations extend horizontally, which enables coupling between the slot antenna 310 and each of the tag modules 300 and 301 for forming two RFID tags.

Figure 12:
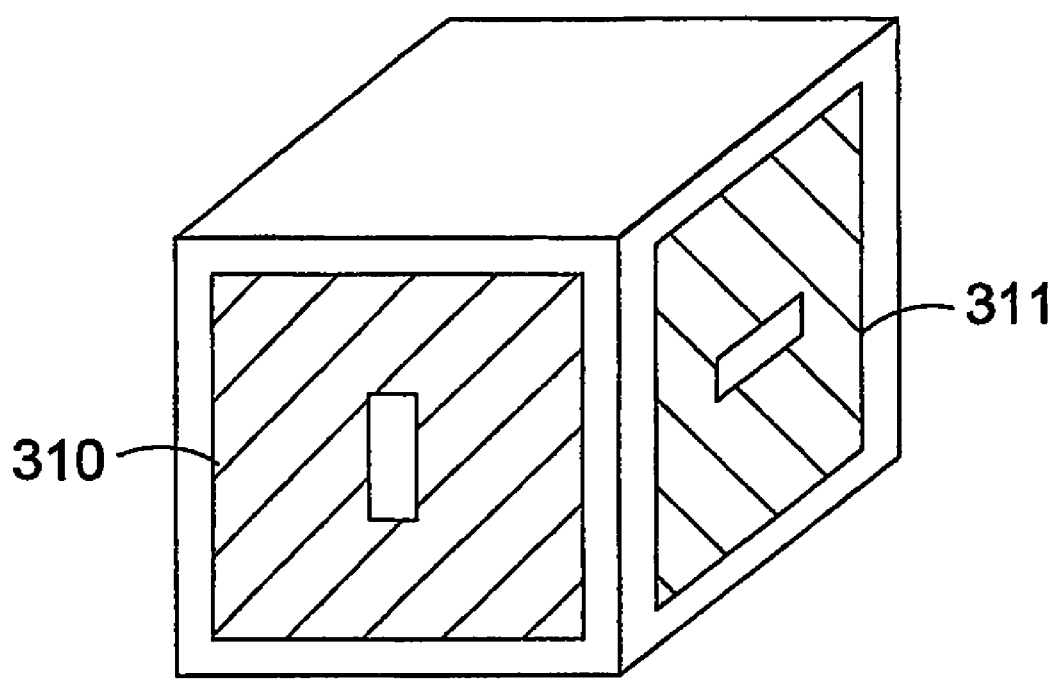
FIG. 12 shows a perspective view of a multiple-element slot antenna structure according to an embodiment of the present invention.
Figure 13:
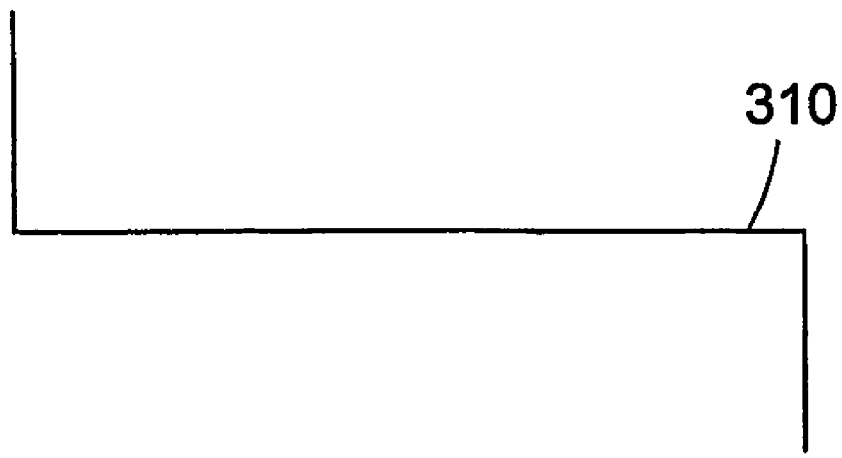
FIG. 13 shows a multidimensional wire antenna structure according to an embodiment of the present invention.

The FIG. 11 embodiment works well if, as shown, the polarization of the tag modules 300, 301 is "sufficiently parallel" to the polarization of the antenna structure 310, but it may not work if this condition is not satisfied. FIGS. 12 and 13 show antenna structures which address this problem. FIG. 12 shows an antenna structure with two antenna elements (slot antennas) 310 and 311, whose polarizations are perpendicular so as to be able to couple with a tag module regardless of its polarization orientation.

FIG. 13 schematically shows an antenna structure consisting of a multidimensional wire 310, i.e. wire 310 is not straight over its entire length. The fact that its ends are bent at right angles with respect to the middle portion of the wire means that its ability to couple with tag modules of a variety of polarization orientations is improved.

The FIG. 12 and FIG. 13 embodiments also improve the ability of a tag reader or similar to communicate with the tag module in multiple directions, i.e. in the case of a crate having an antenna structure as shown in FIG. 12 or 13 and passing through e.g. a door with RFID reader, it does not matter in which orientation the crate passes through the door. In other words, with these embodiments more directions are covered, not only as regards the coupling between the antenna structure and any tag modules, but also as regards communication between a RF communication means (such as a RFID reader) and the antenna structure or any tag modules (via the antenna structure).

Figure 14:
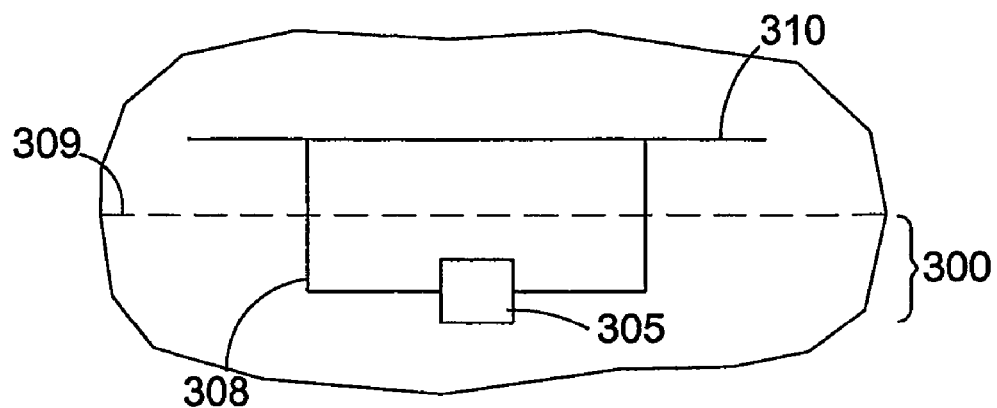
FIG. 14 shows a RFID tag with a preferred line of fracture according to an embodiment of the present invention.

FIG. 14 shows an embodiment in which the antenna structure 310 is initially connected to the tag module 300. The tag module 300 (the lower half of the device shown in FIG. 14) comprises an electronic identification circuit 305 and a conductor 308 coupling the circuit to antenna structure 310. Conductor 308 thus forms a contact coupling between the antenna structure 310 and the circuit 305. A preferred line of fracture 309 such as a weakness in the plastics material encasing the tag module 300 and the antenna structure 310 is provided. The antenna structure 310 can easily be severed from the tag module 300 by breaking along the weakness 309. Once the tag has been severed the tag module cannot be communicated with by RF communication means (such as a RF reader). However, the tag module can be communicated with by connecting a suitable reader to the ends of conductor 308 by a galvanic connection.

The material of the conductor 308 can also be weakened at the preferred line of fracture 309.

Figure 15:
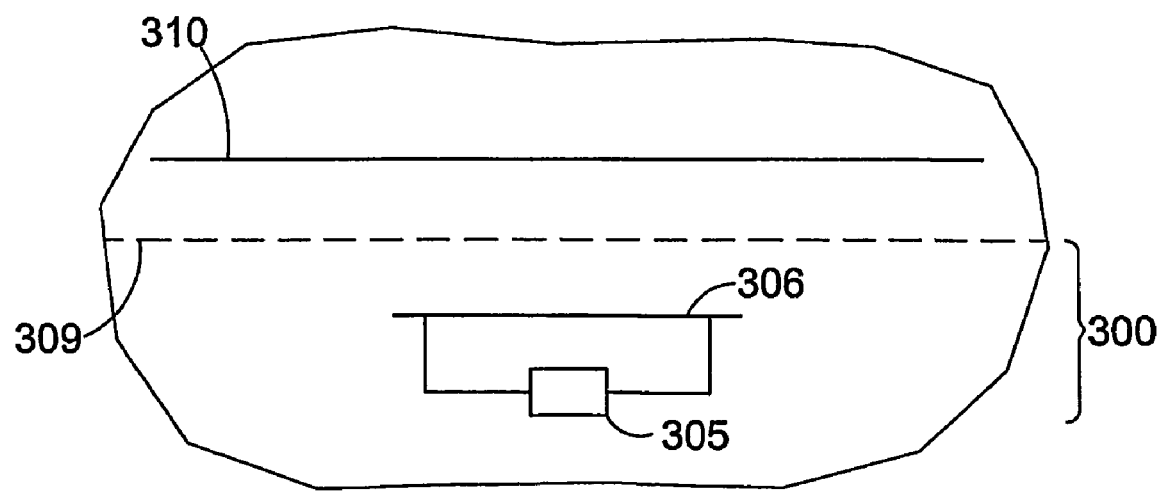
FIG. 15 shows a RFID tag with a preferred line of fracture according to an embodiment of the present invention.

FIG. 15 shows a modification of FIG. 14. In FIG. 15 the tag module 300 comprises an identification circuit 305 and an "internal" antenna 306 of short range. This "internal" antenna is connected to circuit 305 by a galvanic connection, or could be formed as integral part of circuit 305. The circuit 305 is not connected to antenna structure 310 by a galvanic connection. Instead, "internal" antenna 306 is in (non-contact) coupling relationship with "external" antenna structure 310, which effectively increases the range over which the tag module 300 can be communicated with. A preferred line of fracture 309 is again provided, along which the tag module 300 can be severed from antenna structure 310. After severing the tag module 300 can still be communicated with, however only over a relatively short range.

Although the invention has been described in terms of preferred embodiments as set forth above, it should be understood that these embodiments are illustrative only and that the claims are not limited to those embodiments. Those skilled in the art will be able to make modifications and alternatives in view of the disclosure which are contemplated as falling within the scope of the appended claims. Each feature disclosed or illustrated in the present specification may be incorporated in the invention, whether alone or in any appropriate combination with any other feature disclosed or illustrated herein.

The invention claimed is:

1. A Radio Frequency Identification (RFID) tag or label comprising:
   a RFID tag module comprising an electronic identification circuit and a coupling means; and
   an antenna structure coupled to the coupling means,
   wherein the RFID tag module is at least one of separate and in a non-contacting coupled arrangement with, separable, or arranged to be severable from, the antenna structure of the RFID tag or label.

2. The RFID tag or label according to claim 1, wherein the coupling means comprises an antenna that is at least one of connected to, or integral with, the RFID tag module.

3. The RFID tag or label according to claim 1, wherein the antenna structure is coupled to a further electronic identification circuit.

4. The RFID tag or label according to claim 3, wherein the further electronic identification circuit is at least one of integral with, or substantially permanently attached to, the antenna structure.

5. The RFID tag or label according to claim 1, wherein the antenna structure increases the effective aperture of the RFID tag module.

6. The RFID tag or label according to claim 1, wherein the antenna structure at least one of improves the ability to communicate with the RFID tag module, increases the range over which the RFID tag module can be communicated with, or improves the ability to communicate with the RFID tag module in multiple directions.

7. The RFID tag or label according to claim 1, wherein the coupling between the coupling means and the antenna structure is a non-contact coupling.

8. The RFID tag or label according to claim 1, wherein at least one dimension of the antenna structure is substantially an odd multiple of $\lambda/2$, $\lambda$ being the wavelength corresponding to the operating frequency of the RFID tag module.

9. The RFID tag or label according to claim 1, wherein the RFID tag module is constructed such that is substantially not be communicated with when it is not coupled to the antenna structure.

10. The RFID tag or label according to claim 1, wherein the RFID tag module is constructed such that it is communicated with when it is not coupled to the antenna structure.

11. The RFID tag or label according to claim 10, wherein the distance over which it is communicated with when it is coupled to the antenna structure is substantially larger than the distance over which it is communicated with when it is not coupled to the antenna structure.

12. The RFID tag or label according to claim 1, wherein the RFID tag module is at least one of integral with, or attached to, an item, and the antenna structure is at least one of integral with, or attached to, packaging material used for the item.

13. The RFID tag or label according to claim 1, wherein the RFID tag module is communicated with by close proximity means without galvanic contact.

14. An object for use with a first Radio Frequency Identification (RFID) tag module, the object comprising an antenna structure which is at least one of integral with, or attached to, the object and which is arranged to accomplish at least one of the following:
   to improve the ability to communicate with the first RFID tag module,
   to increase the range over which the first RFID tag module can be communicated with, or
   to improve the ability to communicate with the first RFID tag module in multiple directions
   when the first RFID tag module is used in combination with the object so as to form a first RFID tag or label.

15. The object according to claim 14, further comprising a second RFID tag module which is coupled to the antenna structure, so as to form a second RFID tag or label.

16. An object according to claim 15, wherein the second RFID tag module is integral with, or substantially permanently attached to, the remainder of the object.

17. A method of manufacturing a RFID tag or label, comprising:
   providing a RFID tag module comprising an electronic identification circuit and a coupling means; and
   coupling an antenna structure to the coupling means,
   wherein the RFID tag module is at least one of separate and in a non-contacting coupled arrangement with, separable, or arranged to be severable from, the antenna structure of the RFID tag or label.

18. A Radio Frequency Identification (RFID) system comprising:
   at least one Radio Frequency Identification (RFID) tag or label comprising:
      a RFID tag module comprising an electronic identification circuit and a coupling means; and
      an antenna structure coupled to the coupling means,
      wherein the RFID tag module is at least one of separate and in a non-contacting coupled arrangement with, separable, or arranged to be severable from, the antenna structure of the RFID tag or label, and
   at least one RFID communication means.

19. The system according to claim 18, wherein the RFID tag module can be communicated with by means of a first said RFID communication means when the antenna structure is coupled to the coupling means, and can be communicated with by means of a second said RFID communication means when the antenna structure is not coupled to the coupling means, but cannot be communicated with by means of the first said RFID communication means when the antenna structure is not coupled to the coupling means.

20. The system according to claim 18, wherein the RFID communication means comprises a RFID reader.

21. A Radio Frequency Identification (RFID) tag or label comprising:
   a RFID tag module comprising an electronic identification circuit and a coupling means; and
   an antenna structure coupled to the coupling means,
   wherein the RFID tag module is in a non-contacting coupled arrangement with the antenna structure of the RFID tag or label.

22. The RFID tag or label according to claim 21, wherein the RFID tag module is in non-contacting coupled arrangement with the antenna structure by one of an electromagnetic, inductive or capacitive coupling.

23. The RFID tag or label according to claim 21, wherein said antenna structure is a foil.

24. A Radio Frequency Identification (RFID) tag or label comprising:
   a RFID tag module comprising an electronic identification circuit and a coupling means; and
   an antenna structure coupled to the coupling means,
   wherein the RFID tag module is arranged to be severable from the antenna structure of the RFID tag or label.

* * * * *